US009906608B2

(12) United States Patent
Agarwal et al.

(10) Patent No.: US 9,906,608 B2
(45) Date of Patent: Feb. 27, 2018

(54) INTELLIGENT ADAPTATION OF MOBILE APPLICATIONS BASED ON CONSTRAINTS AND CONTEXTS

(71) Applicant: International Business Machines Corporation, Armonk, NY (US)

(72) Inventors: Vikas Agarwal, Noida (IN); Pradipta De, Kolkata (IN); Kuntal Dey, New Delhi (IN); Sumit Mittal, Noida (IN)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 13/873,446

(22) Filed: Apr. 30, 2013

(65) Prior Publication Data
US 2014/0325026 A1 Oct. 30, 2014

(51) Int. Cl.
*H04L 29/08* (2006.01)

(52) U.S. Cl.
CPC .............. *H04L 67/18* (2013.01); *H04L 67/04* (2013.01)

(58) Field of Classification Search
CPC ......... H04L 67/02; H04L 67/04; H04L 67/18; H04W 4/18
See application file for complete search history.

(56) References Cited

U.S. PATENT DOCUMENTS

| 6,854,018 | B1 * | 2/2005 | Li ..................... H04L 67/2847 709/203 |
| 7,398,080 | B2 | 7/2008 | Pyhalammi et al. |
| 7,957,691 | B1 | 6/2011 | Lee |
| 8,011,002 | B1 | 8/2011 | Upadhyay et al. |
| 8,036,690 | B1 * | 10/2011 | Delker ................... H04W 4/18 455/115.3 |
| 8,069,406 | B2 | 11/2011 | Weiss et al. |
| 8,788,328 | B1 * | 7/2014 | George ................. G06Q 90/00 705/14.1 |
| 2003/0093314 | A1 * | 5/2003 | Leung .................. G06Q 30/02 705/14.13 |

(Continued)

FOREIGN PATENT DOCUMENTS

WO WO2007108869 A1 9/2007

OTHER PUBLICATIONS

Zhang, Xinxin et al., "Context-Aware Mobile Web Browsing Based on HTML5," Abstract Only, 9th International Conference on Ubiquitious Intelligence & Computing and 9th International Conference on Autonomic & Trusted Computing (UIC/ATC), Fukuoka, Japan, Sep. 4-7, 2012, 1 page, IEEEXplore Digital Library.

(Continued)

*Primary Examiner* — Backhean Tiv
(74) *Attorney, Agent, or Firm* — Ference & Associates LLC

(57) ABSTRACT

Methods and arrangements for download management. A download request is accepted from a mobile device of a user. The download request is adapted relative to at least one of: user context, and at least one user preference. The adapted download request is sent to a content server. Content is downloaded from the content server, and the received download content is modified relative to at least one of: the user context, and the at least one user preference. The modified download content is delivered to the mobile device of the user. Other variants and embodiments are broadly contemplated herein.

20 Claims, 5 Drawing Sheets

(56) References Cited

U.S. PATENT DOCUMENTS

| | | | |
|---|---|---|---|
| 2003/0135582 A1* | 7/2003 | Allen | G06F 17/30867 709/217 |
| 2003/0200175 A1* | 10/2003 | Wang | G06Q 20/10 705/50 |
| 2004/0193488 A1* | 9/2004 | Khoo | G06Q 30/02 705/14.52 |
| 2005/0060365 A1* | 3/2005 | Robinson | H04L 69/329 709/203 |
| 2005/0163059 A1* | 7/2005 | Dacosta | H04L 41/0896 370/252 |
| 2005/0165747 A1* | 7/2005 | Bargeron | G06F 17/30011 |
| 2005/0198309 A1* | 9/2005 | Li | H04L 67/2847 709/227 |
| 2007/0100796 A1* | 5/2007 | Wang | G06Q 30/02 |
| 2007/0198716 A1 | 8/2007 | Knowles et al. | |
| 2007/0271139 A1* | 11/2007 | Fiorini | G06Q 30/02 705/14.73 |
| 2008/0137755 A1* | 6/2008 | Onur | H04N 19/102 375/240.26 |
| 2008/0140529 A1* | 6/2008 | Agarwal | G06Q 30/02 705/14.54 |
| 2008/0153513 A1* | 6/2008 | Flake | G06Q 30/02 455/456.3 |
| 2008/0183582 A1* | 7/2008 | Major | G06Q 30/02 705/14.73 |
| 2008/0242279 A1 | 10/2008 | Ramer et al. | |
| 2008/0248815 A1* | 10/2008 | Busch | H04W 4/02 455/456.5 |
| 2008/0288983 A1* | 11/2008 | Johnson | G06Q 30/02 725/46 |
| 2009/0063229 A1* | 3/2009 | Coladonato | G06Q 30/02 705/14.44 |
| 2009/0076997 A1* | 3/2009 | Ducheneaut | G06Q 30/02 706/47 |
| 2009/0163227 A1* | 6/2009 | Collins | G06Q 30/02 455/456.3 |
| 2009/0171780 A1* | 7/2009 | Aldrey | G06Q 30/02 705/14.69 |
| 2009/0197582 A1* | 8/2009 | Lewis | H04W 4/02 455/414.2 |
| 2009/0199114 A1* | 8/2009 | Lewis | G06Q 30/02 715/763 |
| 2009/0248663 A1* | 10/2009 | Maniyar | G06F 17/3087 |
| 2009/0254660 A1* | 10/2009 | Hanson | H04L 12/10 709/226 |
| 2009/0319187 A1* | 12/2009 | Deeming | G06Q 30/02 701/300 |
| 2009/0327401 A1* | 12/2009 | Gage | G06F 15/16 709/203 |
| 2010/0125491 A1* | 5/2010 | Elliott | G06Q 30/02 705/14.4 |
| 2010/0211464 A1* | 8/2010 | Zhu | G06Q 30/02 705/14.53 |
| 2010/0325111 A1 | 12/2010 | Aravamudan et al. | |
| 2011/0082752 A1* | 4/2011 | Dube | G01C 21/3484 705/14.67 |
| 2011/0247027 A1* | 10/2011 | Davis | H04N 21/25435 725/5 |
| 2012/0084248 A1 | 4/2012 | Gavrilescu | |
| 2012/0131145 A1* | 5/2012 | Garg | H04W 4/18 709/219 |
| 2012/0254442 A1* | 10/2012 | Uemura | G06F 9/5011 709/226 |
| 2012/0290383 A1* | 11/2012 | Busch | G06Q 30/02 705/14.36 |
| 2013/0262203 A1* | 10/2013 | Frederick | G06Q 30/0209 705/14.12 |
| 2013/0268485 A1* | 10/2013 | Cao | G06F 8/60 707/609 |
| 2014/0006129 A1* | 1/2014 | Heath | G06Q 30/0222 705/14.23 |
| 2014/0297419 A1* | 10/2014 | Ramachandra | G06Q 30/0267 705/14.64 |
| 2014/0325026 A1* | 10/2014 | Agarwal | H04L 67/04 709/219 |

OTHER PUBLICATIONS

Pinheiro, Manuele Kirsch et al., "Personalizing Web-Based Information Systems through Context-Aware User Profiles," The Second International Conference on Mobile Ubiquitous Computing, Systems, Services and Technologies, Valencia, Spain, Sep. 29-Oct. 4, 2008, pp. 231-238, IEEE Computer Society, Washington, D.C., USA.

Zhang, Dongsong et al., "Personalized Content Delivery to Mobile Devices," Abstract Only, IEEE International Conference on Systems, Man and Cybernetics, Washington, D.C., USA, Oct. 5-8, 2003, 1 page, IEEEXplore Digital Library.

\* cited by examiner

INTELLIGENT ADAPTATION OF MOBILE APPLICATIONS BASED ON CONSTRAINTS AND CONTEXTS

BACKGROUND

Hybrid mobile applications which access backend content are greatly increasing in popularity. Such applications include locally executable components in addition to remotely available components. By way of example, much remote content in the form of web content can be accessed through hybrid mobile applications.

Generally, mobile hybrid applications can open web pages internally by way of remote component access. Inasmuch as web pages are becoming increasingly content-heavy, much content that ends up being loaded may well not be of immediate use to a user (e.g., videos or ads).

Typically, a hybrid mobile application will inherently undertake default browsing behavior, which normally is self-defined by the mobile browser. While accessing remote content such as web content, it will start downloading different portions of a page, e.g., graphics or video, by using separate threads simultaneously. This can represent a tremendous use of resources such as battery and network bandwidth, which ends up being wasteful if indeed some or much of the content is not regarded by the user as being essential or of any utilitarian value.

BRIEF SUMMARY

In summary, one aspect of the invention provides a method of managing downloads to a mobile device, said method comprising: utilizing at least one processor to execute computer code configured to perform the steps of: accepting a download request from a mobile device of a user; adapting the download request relative to at least one of: user context, and at least one user preference; sending the adapted download request to a content server; receiving download content from the content server; evaluating the received download content relative to at least one of: the user context, and the at least one user preference; and delivering the evaluated download content to the mobile device of the user.

Another aspect of the invention provides an apparatus for managing downloads to a mobile device, said apparatus comprising: at least one processor; and a computer readable storage medium having computer readable program code embodied therewith and executable by the at least one processor, the computer readable program code comprising: computer readable program code configured to accept a download request from a mobile device of a user; computer readable program code configured to adapt the download request relative to at least one of: user context, and at least one user preference; computer readable program code configured to send the adapted download request to a content server; computer readable program code configured to receive download content from the content server; computer readable program code configured to evaluate the received download content relative to at least one of: the user context, and the at least one user preference; and computer readable program code configured to deliver the evaluated download content to the mobile device of the user.

An additional aspect of the invention provides a computer program product for managing downloads to a mobile device, said computer program product comprising: a computer readable storage medium having computer readable program code embodied therewith, the computer readable program code comprising: computer readable program code configured to accept a download request from a mobile device of a user; computer readable program code configured to adapt the download request relative to at least one of: user context, and at least one user preference; computer readable program code configured to send the adapted download request to a content server; computer readable program code configured to receive download content from the content server; computer readable program code configured to evaluate the received download content relative to at least one of: the user context, and the at least one user preference; and computer readable program code configured to deliver the evaluated download content to the mobile device of the user.

A further aspect of the invention provides method comprising: obtaining download content for provision to a user, the download content comprising at least two components; determining user preferences relative to the at least two components; detecting an operating context of the user; ordering the at least two components of the download content based on the user preferences and the operating context of the user; and providing at least a portion of the download content to the user, based on the ordering of the at least two components of the download content.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
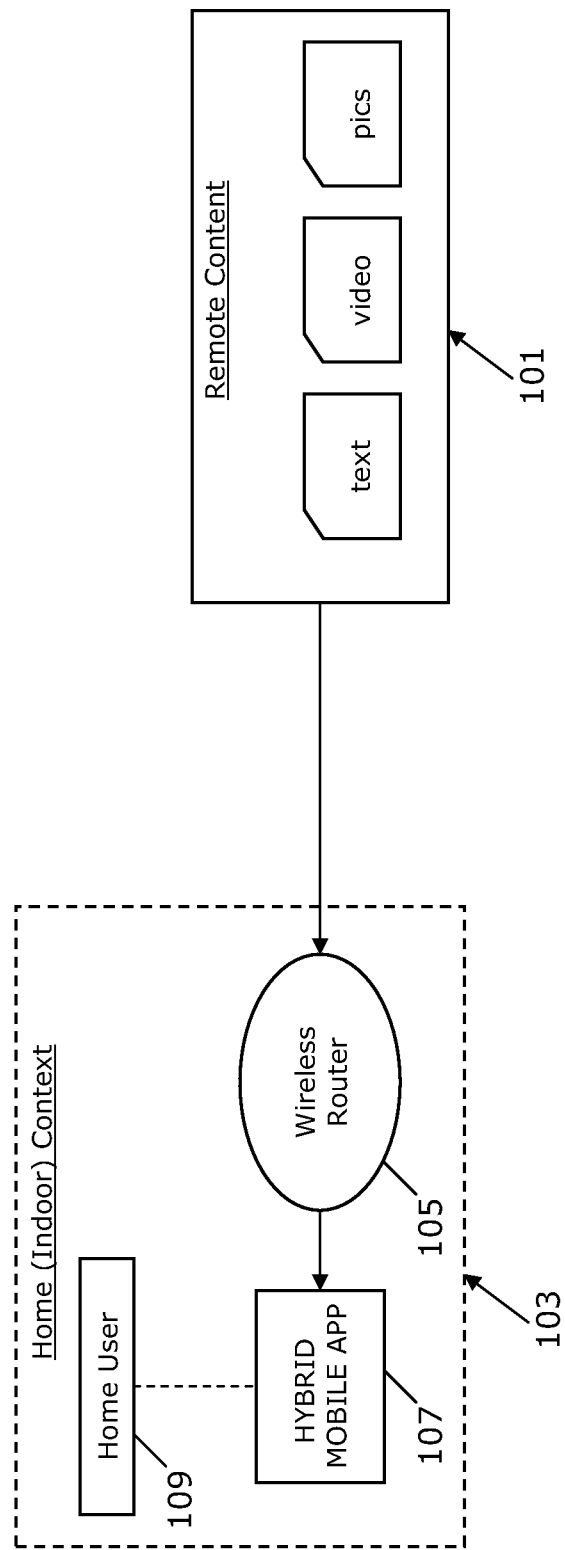
FIG. 1 schematically illustrates use of a hybrid mobile application in an indoor context.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

Figure 2:
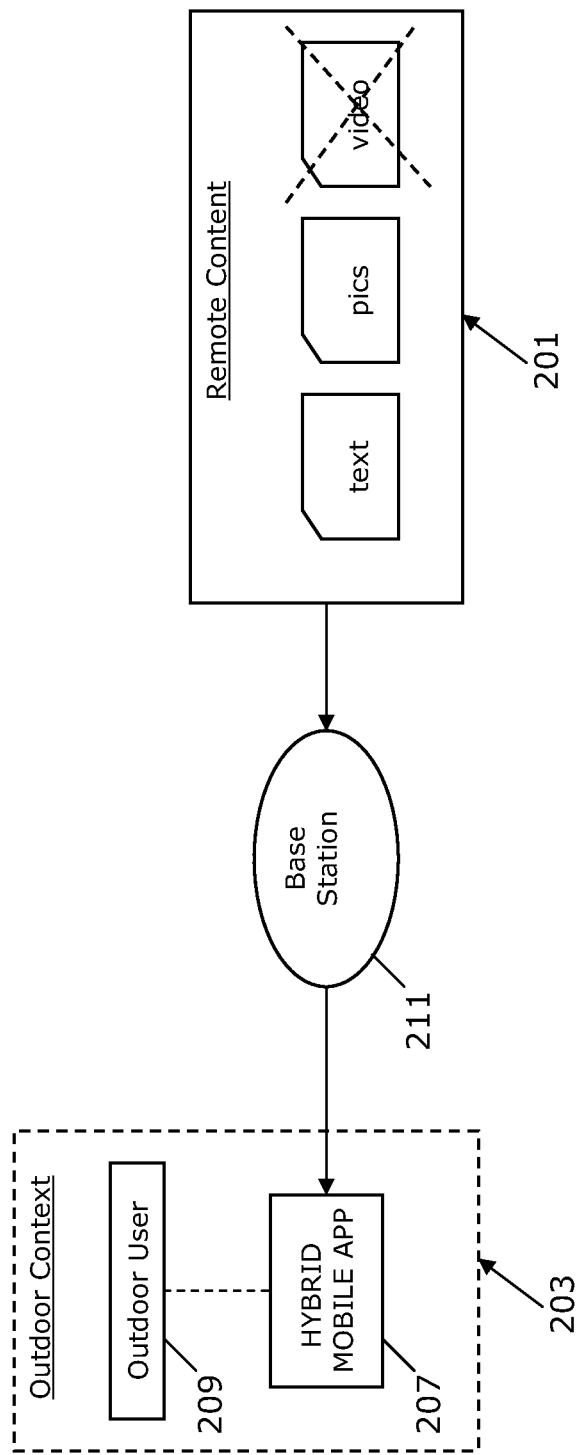
FIG. 2 schematically illustrates use of a hybrid mobile application in an outdoor context.
Figure 3:
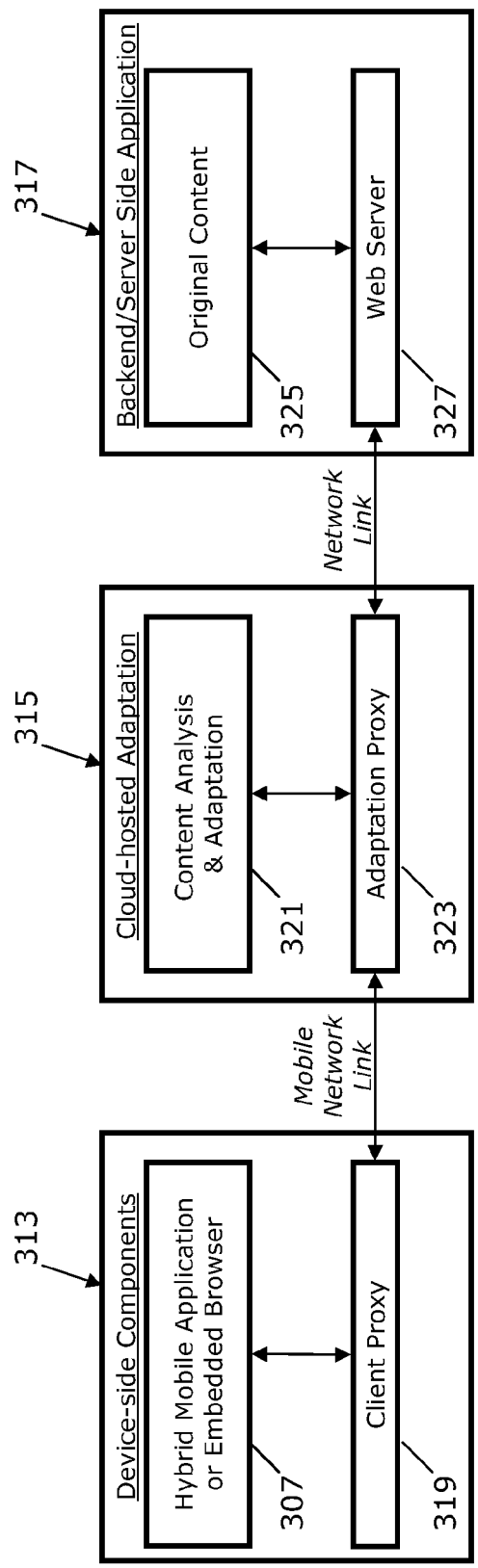
FIG. 3 schematically illustrates a general system architecture.

To facilitate easier reference, in advancing from FIG. 1 to and through FIG. 3, a reference numeral is advanced by a multiple of 100 in indicating a substantially similar or analogous component or element with respect to at least one component or element found in at least one earlier figure among FIGS. 1-3.

Broadly contemplated herein, in accordance with at least one embodiment of the invention, is a "smart loader" which is used for downloading embedded content components from hybrid mobile applications; such content can include, e.g., video, graphics, or ads, and is identified by using meta-tags. Such content can be embodied by web content or any other form of remote content.

In accordance with at least one embodiment of the invention, a smart loader can support automatic detection of a user's intention. For instance, if a user is in a shopping mall, which may be determined based on available location information, the hybrid mobile application can fetch relevant ads before other items are fetched. Content download can be serialized in order to optimize resource usage (e.g., minimization of bandwidth usage), wherein serialization is determined based on context.

As such, by way of an illustrative example in accordance with at least one embodiment of the invention, a user may be sitting in a pizza restaurant (again, determined based on available location information). Thus, the hybrid mobile application here might not download ads related to restaurants. By way of another illustrative example, if a user accesses a news site, a sequential order of downloading (of news items) can be based on the city or other location in which the user finds him/herself (determined based on location information). Generally, a loading process in different scenarios will respect user contexts, that will determine items of potential interest for loading, and resource constraints, that will determine the items that logistically can be loaded.

As such, there are broadly contemplated herein, in accordance with at least one embodiment of the invention, methods and arrangements for loading a page partially, or "lazily", by sequentially fetching content, wherein the sequence of loading content is determined on the basis of a multitude of parameters. Such parameters can include available network bandwidth, phone battery level, and a user's context, which itself might include a location and a user's past preferences.

More particularly, there is broadly contemplated herein, in accordance with at least one embodiment of the invention, an adaptation of backend remote content access for hybrid (or essentially any) mobile applications, driven by user context and respecting user preference. There can be involved a partial, or "lazy" download of components of a hybrid application that normally require backend content access, such as web access; component items known to be preferred by a user can be loaded on a presumption of higher priority. Also broadly contemplated herein is a resource-aware adaptation of backend remote content access, such as web content access, for hybrid (or essentially any) applications. Thus, components that involve less resource consumption can be loaded earlier in the loading cycle.

As shown in FIG. 1, by way of illustrative example in accordance with at least one embodiment of the invention, remote content 101 (e.g., which includes text, video and pictures) may be delivered to a user's indoor home context 103. A wireless router 105 in the home context 103 can thus deliver the content 101 to a hybrid mobile application (or app) 107 for use by the user 109. Normally, it is desirable to be able to fully receive and download composite remote content including text, video and pictures (and possibly one or more other components). However, as can be appreciated further herein, resources such as battery or bandwidth may not be sufficient to permit such loading, at least with a desired degree of efficiency.

As such and by way of contrast, as shown in FIG. 2, which illustrates an example in accordance with at least one embodiment of the invention, remote content 201 may be delivered to an outdoor context 203. In this case, a base station 211 routes the content to hybrid mobile application 207 for use by the user 209. Because of this context, embodiments of the invention encompass an idea of adaptively omitting the video portion of the remote content 201; e.g., such an adaptive decision may be made to the extent that it is determined that bandwidth including video cannot be easily accommodated by the mobile phone, or that base station traffic is too congested, or the client's mobile phone is short on resources such as battery, or the video itself might not be relevant to the user's context.

FIG. 3 schematically illustrates, in accordance with at least one embodiment of the invention, a general system architecture which includes device-side components 313, a cloud-hosted adaptation module 315 and a (backend or server side) application module 317. Device-side components (313) include a hybrid mobile application (or embedded browser) 307 in communication with a client proxy 319, both at a mobile device. Cloud-hosted adaptation components (315) include a content analysis and adaptation module 321 as well as an adaptation proxy 323, while application components (317) include original content 325 and a web server 327.

In accordance with at least one embodiment of the invention, in response to a download request from the mobile device side (313), e.g., via hybrid mobile app (or embedded browser) 313, the client proxy 319 intercepts the request. Based on user context and/or resource use parameters (as discussed herethroughout), client proxy 319 then adds additional parameters that permit the adaptation proxy 323 to make intelligent adaptation. Such parameters can include, though need not be limited to: an estimate of current or future available bandwidth with respect to a GPRS (general packet radio service) link that connects the device (313) with external download sources; user location (e.g., based on GPS [global positioning service] data); information on other apps currently running on the client device; system resource usage; and residual battery life (e.g., which can be probed by the client proxy 319 before sending the request to adaptation proxy 323). Adaptation proxy 323 then works with the analysis/adaptation module 321 to modify the original download request. Generally, usage history and actions can be monitored by the client proxy 319, and be asynchronously updated to the adaptation proxy 323. Generally, it can be understood that the analysis/adaptation module 321 is embodied by an engine that analyzes monitored details, while adaptation proxy 323 carries out the actual back-end adaptation process, driven by analyses from module 321.

As such, in accordance with at least one embodiment of the invention, an aim of the work of client proxy 319, adaptation proxy 323 and analysis/adaptation module 321 is to optimize resource usage, under multiple parameter constraints, with minimal impact on user experience (especially to the extent that such an impact can be assessed in light of user context). Information on user experience can then be assessed and collected via a suitable feedback mechanism.

In accordance with at least one embodiment of the invention, adaptation proxy 323 forwards the download request over a network link to the corresponding application server 327 to fetch content 325. A modified request is thus sent to server 327, both by way of making context-guided changes as discussed heretofore, as well as removing superfluous meta-parameters such as network bandwidth. Once the server 327 responds, the adaptation proxy 323 analyzes the content and intelligently weeds out (or demarcates) portions that might not be useful to the user in the given context. User feedback, as mentioned above, can permit users to identify portions of the content as useful, and the system can record user's feedback collected under different contexts to proactively apply accumulated learning on a future occasion, for an improved loading experience.

The disclosure now turns to brief discussion of a content adaptation technique, in accordance with at least one embodiment of the invention. First, a utility function set is defined $\{f_1, f_2, \ldots, f_n\}$ with one function for each parameter (e.g., battery, network bandwidth, etc.). On a scale of 0 to 1, each function is a measure of the value that the adaptation or removal of an item provides with respect to a given parameter. For example, if $f_1$ represents battery function for battery, then for 100% battery level $f_1=0$. Generally, $f_1$ (low battery)>$f_1$ (high battery). Additionally, if $f_2$ represents network bandwidth, then $f_2$ (low bandwidth)>$f_2$ (high bandwidth). Similarly, utility functions are defined for user context and a user's known past preferences.

In accordance with at least one embodiment of the invention, corresponding weights $\{w_1, w_2, \ldots, w_n\}$ are defined for each parameter, with the weights quantitatively conveying a relative priority of each parameter. Accordingly, a determination is made upon each access of backend content and for each item (e.g., picture, video, set of text) considered for removal from downloaded content before sending a response (or download) to the client. This determination involves computing a weighted utility of removal:

$$\sum_{i=1}^{N} w_i f_i.$$

If the summed, weighted utility quantity is greater than a given threshold, then the item in question can be removed or cancelled before it can be downloaded to the client.

Some practical scenarios, by way of illustrative and non-restrictive example, can be explored in accordance with at least one embodiment of the invention. In one scenario, if a user wants to access a favorite news portal using a news reader hybrid application, he/she loads the news reader mobile app (a hybrid app) onto the mobile phone. The app accesses the user's favorite news portal and internally makes a web page download request. A "smart loader" (as broadly contemplated herein) then evaluates the resource requirements and analyzes the page components along with the user's context and component setting preferences, and serializes the component items to download the higher priority items earlier. For example, if it is determined that the user is reading from home then any images will be shown, but certain advertisements might be suppressed. On the other hand, if the user is determined to be reading from a pizza restaurant, then discount coupons for soda can be loaded, even if that requires dropping some thumbnail image to satisfy resource constraints.

In another scenario, by way of illustrative and non-restrictive example, in accordance with at least one embodiment of the invention, a user may want to browse the Internet from a mobile phone browser (which can be considered to be a type of application) and read a favorite blog. The user then opens up the browser and types in the blog URL. At that point, blog components are loaded in the browser app respecting the user context and the resource constraints, where one or more components are then dropped if determined to be required.

In a further scenario, by way of illustrative and non-restrictive example, in accordance with at least one embodiment of the invention, downloadable content may be annotated with tags, which tags could be in the form of text, graphics or video. Additional sub-tags, e.g., news (politics, sports), ads (restaurant, retail) can also be included. To adapt downloading based on tags, a server side proxy can parse tags and sub-tags while a client proxy embeds location information, e.g., as collected from GPS data. Tags and sub-tags can then be matched against location information to direct component items that may be relevant to user context;

e.g., a user in shopping mall may be sent a preponderance of ads instead of other types of content.

In yet another scenario, by way of illustrative and non-restrictive example, in accordance with at least one embodiment of the invention, channel conditions can be inferred at the server side using a non-intrusive measurement of packet rate. The client side proxy can then include "residual battery" and location information with a download request. By way of a multi-dimensional adaptation, then, if channel conditions are good, the battery is low, and the user is in a shopping mall, ads can be sent to the user simply by using low-resolution images, with videos and graphics being suppressed.

Figure 4:
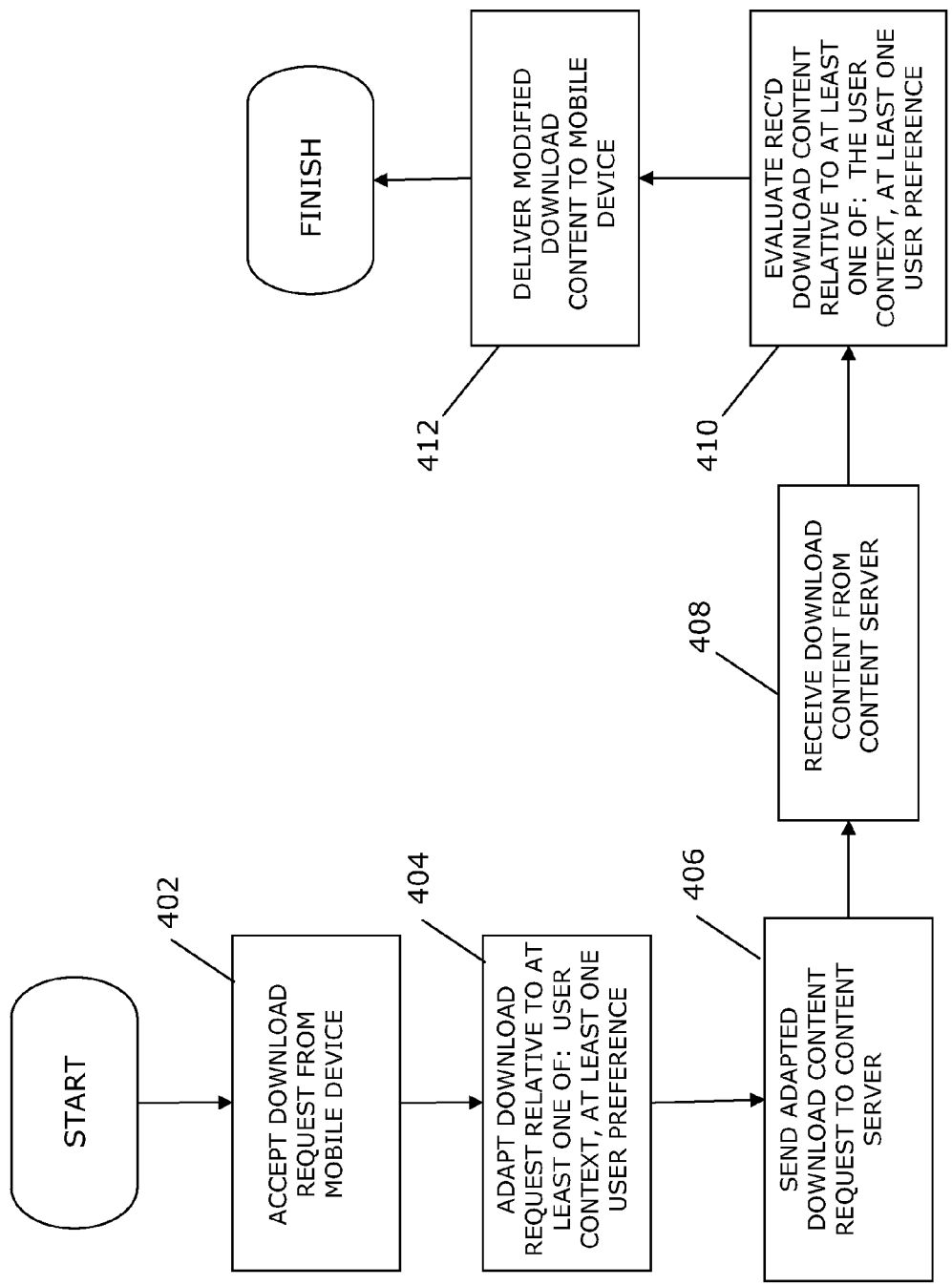
FIG. 4 sets forth a process more generally for management of download content

FIG. 4 sets forth a process more generally for management of download content, in accordance with at least one embodiment of the invention. It should be appreciated that a process such as that broadly illustrated in FIG. 4 can be carried out on essentially any suitable computer system or set of computer systems, which may, by way of an illustrative and non-restrictive example, include a system such as that indicated at 12' in FIG. 5. In accordance with an example embodiment, most if not all of the process steps discussed with respect to FIG. 4 can be performed by way of a processing unit or units and system memory such as those indicated, respectively, at 16' and 28' in FIG. 5.

As shown in FIG. 4, in accordance with at least one embodiment of the invention, a download request is accepted from a mobile device of a user (402). The download request is adapted relative to at least one of: user context, and at least one user preference (404). The adapted download request is sent to a content server (406). Content is downloaded from the content server (408), and the received download content is modified relative to at least one of: the user context, and the at least one user preference (410). The modified download content is delivered to the mobile device of the user (412).

Figure 5:
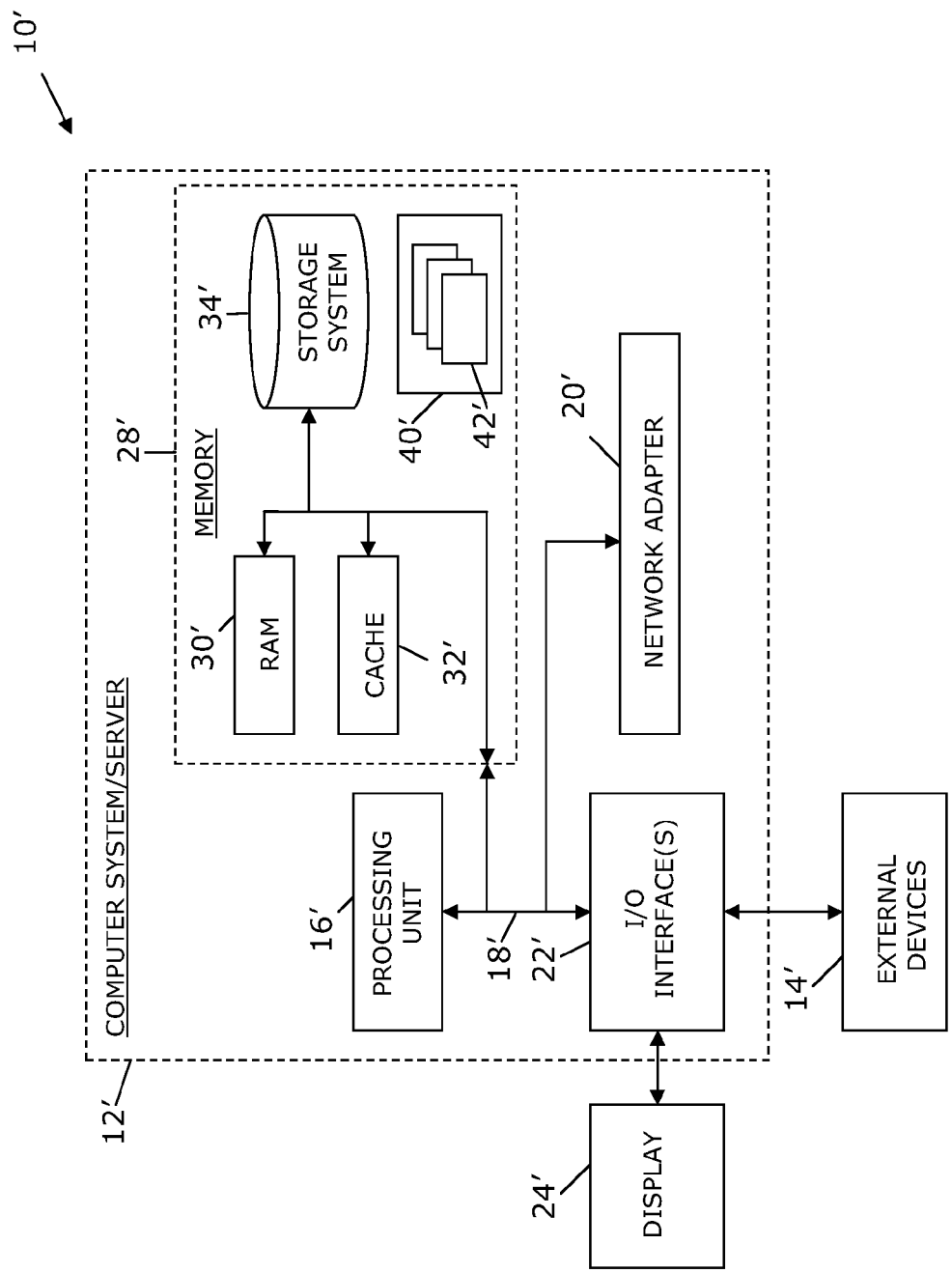
FIG. 5 illustrates a computer system.

Referring now to FIG. 5, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:
1. A method of managing downloads to a mobile device, said method comprising:
utilizing at least one processor to execute computer code configured to perform the steps of:
accepting a download request for embedded content from a mobile device of a user, wherein the embedded content comprises components identified with meta-tags from hybrid mobile data;

determining if the download request for embedded content should be modified, wherein the determining is based upon an awareness of resources of the mobile device identified using at least one parameter of the mobile device selected from the group consisting of: available network bandwidth, mobile device battery level, and geographic location of the mobile device and wherein the determining is based upon optimizing usage of the resources;

modifying, based upon determining that the download request for embedded content should be modified, the download request of the embedded content to sequentially fetch the embedded content wherein the sequential fetching comprises downloading different components of the embedded content at different sequential time frames and wherein a sequence of download of the different components is based upon at least one of: information from a device sensor, user context, and at least one user preference and wherein the modifying the download request comprises failing to download at least one of the different components of the embedded content; and based on the parameters of the user device and user feedback, applying accumulated learning to the download request for the embedded content;

sending the modified download request for the embedded content to a content server;

receiving the modified download content from the content server; and delivering the modified download content to the mobile device of the user.

2. The method according to claim 1, wherein said modifying comprises an efficient resource aware adaptation determination of the download request of the embedded content relative to: residual battery life of the mobile device, available bandwidth for delivering content to the mobile device of the user, system resource usage, and information relating to other content currently running on the mobile device of the user.

3. The method according to claim 1, wherein the user context includes a location from which the user is operating the mobile device.

4. The method according to claim 3, comprising automatically detecting the user context.

5. The method according to claim 1, wherein the user context includes at least one member selected from the group consisting of: a busy status of the user, a work location of the user, proximity of at least one pre-defined family member of the user, proximity of at least one pre-defined friend of the user, and a wireless plan to which the user subscribes.

6. The method according to claim 1, comprising modifying the received download request content from hybrid mobile data from a mobile device relative to the user context and the at least one user preference.

7. The method according to claim 6, wherein said modifying comprises setting parameters of a mobile device set for efficient resource aware sequential fetching of the embedded content to be delivered to the mobile device of the user.

8. The method according to claim 6, wherein said modifying comprises sequentially fetching preferred partial content for optimal resource usage to be delivered to the mobile device of the user based on the location context of the user received from the device sensor.

9. The method according to claim 8, wherein said sequentially fetching comprises ordering on a basis of predicting importance of content to the user.

10. The method according to claim 8, wherein said sequentially fetching comprises ordering on a basis of at least one member selected from the group consisting of: a content tag, the at least one user preference, and the user context.

11. The method according to claim 6, wherein said modifying step comprises modifying the preferred download request relative to the at least one user preference, said method further comprising:
monitoring user actions and preferences over time; and
updating the at least one user preference employed in said modifying.

12. The method according to claim 1, comprising:
installing a client proxy at the mobile device of the user;
said accepting comprising communicating with the client proxy.

13. The method according to claim 1, wherein the at least one user preference is determined via the user indicating relative importance among items in the download content.

14. The method according to claim 1, wherein the at least one user preference is determined via consulting pre-set user configurations for items in download content.

15. An apparatus for managing downloads to a mobile device, said apparatus comprising:
at least one processor; and
a non-transitory computer readable storage medium having computer readable program code embodied therewith and executable by the at least one processor, the computer readable program code comprising:
computer readable program code configured to accept a download request for embedded content from a mobile device of a user, wherein the embedded content comprises components identified with meta-tags from hybrid mobile data;
computer readable program code configured to determine if the download request for embedded content should be modified, wherein the determining is based upon an awareness of resources of the mobile device identified using at least one parameter of the mobile device selected from the group consisting of: available network bandwidth, mobile device battery level, and geographic location of the mobile device and wherein the determining is based upon optimizing usage of the resources;
computer readable program code configured to modify, based upon determining that the download request for embedded content should be modified, the download request of the embedded content to sequentially fetch the embedded content wherein the sequential fetching comprises downloading different components of the embedded content at different sequential time frames and wherein a sequence of download is based upon at least one of: information from a device sensor, user context, and at least one user preference and wherein the modifying the download request comprises failing to download at least one of the different components of the embedded content; and
computer readable program code configured to apply, based on the parameters of the user device and user feedback, applying accumulated learning to the download request for the embedded content;
computer readable program code configured to send the modified download request for the embedded content to a content server;
computer readable program code configured to receive the modified download content from the content server; and computer readable program code configured to deliver the modified download content to the mobile device of the user.

16. An computer program product for managing downloads to a mobile device, said computer program comprising:
at least one processor; and
a non-transitory computer readable storage medium having computer readable program code embodied therewith and executable by the at least one processor, the computer readable program code comprising:
computer readable program code configured to accept a download request for embedded content from a mobile device of a user, wherein the embedded content comprises components identified with meta-tags from hybrid mobile data;
computer readable program code configured to determine if the download request for embedded content should be modified, wherein the determining is based upon an awareness of resources of the mobile device identified using at least one parameter of the mobile device selected from the group consisting of: available network bandwidth, mobile device battery level, and geographic location of the mobile device and wherein the determining is based upon optimizing usage of the resources;
computer readable program code configured to modify, based upon determining that the download request for embedded content should be modified, the download request of the embedded content to sequentially fetch the embedded content wherein the sequential fetching comprises downloading different components of the embedded content at different sequential time frames and wherein a sequence of download is based upon at least one of: information from a device sensor, user context, and at least one user preference and wherein the modifying the download request comprises failing to download at least one of the different components of the embedded content; and
computer readable program code configured to apply, based on the parameters of the user device and user feedback, applying accumulated learning to the download request for the embedded content;
computer readable program code configured to send the modified download request for the embedded content to a content server;
computer readable program code configured to receive the modified download content from the content server; and
computer readable program code configured to deliver the modified download content to the mobile device of the user.

17. The computer program product according to claim 16, wherein said computer readable program code is configured to further modify an efficient resource aware adaptation determination of the download request relative to: residual battery life of the mobile device, available bandwidth for delivering content to the mobile device of the user, system resource usage, and information relating to other content currently running on the mobile device of the user.

18. The computer program product according to claim 16, wherein the user context includes a location from which the user is operating the mobile device.

19. The computer program product according to claim 16, wherein said computer readable program code is configured to order content to be delivered to the mobile device of the user.

20. A method comprising:
utilizing at least one processor to execute computer code configured to perform the steps of:
obtaining download embedded content to a mobile device for provision to a user, the download content comprising at least two components, wherein the embedded content comprises components identified with meta-tags from hybrid mobile data;
determining if the download content should be modified, wherein the determining is based upon an awareness of resources of the mobile device identified using at least one parameter of the mobile device selected from the group consisting of: available network bandwidth, mobile device battery level, and geographic location of the mobile device and wherein the determining is based upon optimizing usage of the resources
wherein the download content is evaluated, based upon determining that the download content should be modified, by a modifying technique;
determining user preferences relative to the at least two components by setting parameters of a user device for modifying the download content;
detecting an operating context of the device of the user;
ordering the at least two components of the download embedded content based on the user preferences and the operating context of the device of the user; and
providing partial download content to the user, based on the ordering of the at least two components of the download content, wherein the ordering is based on at least one of: information from a device sensor, user context, and at least one user preference and wherein the providing partial download content comprises failing to download at least one of the at least two components of the embedded content.

* * * * *